United States Patent [19]

Guest et al.

[11] Patent Number: 5,250,606
[45] Date of Patent: Oct. 5, 1993

[54] POLYMER BLEND COMPOSITIONS CONTAINING A STYRENIC COPOLYMER, AN ACETAL POLYMER AND A THERMOPLASTIC POLYESTER OR POLYCARBONATE RESIN INGREDIENT

[75] Inventors: Martin J. Guest, Terneuzen; P. F. M. v/d Berghen, Graauw, both of Netherlands; Ludo M. Aerts, Lokeren, Belgium; Antonios Gkogkidis, Terneuzen, Netherlands; Abraham F. de Bert, Zelzate, Belgium

[73] Assignee: The Dow Chemical Company, Midland, Mich.

[21] Appl. No.: 865,806

[22] Filed: Apr. 7, 1992

Related U.S. Application Data

[63] Continuation of Ser. No. 474,171, Feb. 2, 1990, abandoned.

[51] Int. Cl.$^5$ .................. C08L 51/04; C08L 55/02
[52] U.S. Cl. .................. 524/504; 524/507; 524/509; 525/64; 525/66; 525/67; 525/125; 525/133; 525/166; 525/399; 525/400
[58] Field of Search .......... 524/509, 504, 507; 525/66, 64, 67, 399; 528/125, 133

[56] References Cited

U.S. PATENT DOCUMENTS

| | | | |
|---|---|---|---|
| 3,646,159 | 2/1972 | Miller | 525/398 |
| 4,101,504 | 7/1978 | Cooper | 525/68 |
| 4,179,479 | 12/1979 | Carter | 525/66 |
| 4,743,650 | 5/1988 | Boutni | 525/92 |
| 4,968,756 | 11/1990 | Silvis | 525/399 |

FOREIGN PATENT DOCUMENTS 61-171756  8/1986  Japan.

*Primary Examiner*—Patricia A. Short

[57] ABSTRACT

The present invention pertains to thermoplastic polymer blends which comprise a monovinylidene aromatic copolymer, an acetal polymer and a thermoplastic polycarbonate resin or a polyester resin derived from the reaction of a dicarboxylic acid and a glycol, and which may also optionally contain an elastomeric material such as a thermoplastic polyurethane or an elastomeric copolyester. The resulting polymer blends have good processability and a beneficial combination of physical and chemical properties including thermal/dimensional stability, impact resistance, chemical resistance and environmental stress crack resistance. Said polymer blends are suitable for use in the preparation of a variety of molded utilitarian articles having good appearance and paintability.

9 Claims, No Drawings

POLYMER BLEND COMPOSITIONS CONTAINING A STYRENIC COPOLYMER, AN ACETAL POLYMER AND A THERMOPLASTIC POLYESTER OR POLYCARBONATE RESIN INGREDIENT

CROSS-REFERENCE TO RELATED APPLICATION

This is a continuation-in-part of application Ser. No. 474,171, filed Feb. 2, 1990, now abandoned.

BACKGROUND OF THE INVENTION

The present invention pertains generally to thermoplastic polymer blends comprising a monovinylidene aromatic copolymer in combination with an acetal polymer and with one or more thermoplastic polycarbonate or polyester homopolymer or copolymer resin ingredients. In certain preferred embodiments hereof, the indicated polymer blends also contain as a fourth polymer component therein an elastomeric polymer selected from the group consisting of thermoplastic polyurethanes, copolyester elastomers and combinations thereof. In another preferred embodiment, the monovinylidene aromatic copolymer is a rubber-modified monovinylidene aromatic copolymer having from about 1 to about 40 weight percent of dispersed rubber particles contained therein.

Blends of various and varying types of polymeric materials have been suggested over the years in a variety of prior art references. Of these, the prior art references utilizing acetal resins as blend components generally illustrate compositions in which the acetal resin forms the major or continuous phase, presumably because of large shrinkage and associated interfacial stress build-up occurring upon cooling from the melt. For example, U.S. Pat. No. 4,665,126 to Kusumgar et al. discloses certain polymeric molding compositions containing a predominant amount (e.g., from about 60 to 95 weight percent) of an acetal polymer ingredient in combination with relatively lesser amounts (e.g., from about 4 to 30 and from about 1 to 10 weight percent, respectively) of a thermoplastic polyurethane (TPU) and a multiphase composite interpolymer such as, for example, a butadiene-based, rubber-modified styrene/methyl- methacrylate polymer. Such Kusumgar et al. formulations are said to have improved impact strength relative to that of the acetal polymer per se and relative to that of comparable two component acetal/TPU or acetal/multiphase composite interpolymer blends and to be useful in various molding applications.

U.S. Pat. No. 4,694,042 to McKee et al. pertains to thermoplastic molding polymer blends containing a minor proportion (i.e., from 5 to 50 parts) by volume of a partially or completely crystalline polymer such as nylon, polyacetal, etc. wherein said crystalline polymer, even though employed in minor volumetric proportion, is nevertheless considered to form a coherent phase and wherein the second, major proportion component forms a dispersed phase therein. Within the indicated McKee et al. blends, said major proportion (i.e., from 50 to 95 parts by volume) component consists of one or more crosslinked, emulsion-polymerized elastomeric polymers such as, for example, butadiene or acrylate rubber-based graft copolymers containing either from 10 to 50 weight percent of a shell having a glass transition temperature of less than −10° C. or a substantially lesser amount of a hard polymer shell of styrene, methylmethacrylate or styrene acrylonitrile copolymer. Acetal resin-based compositions are not evident in the working examples.

British Patent 1,311,305 discloses thermoplastic molding compositions composed of a mixture of from 50 to 99 weight percent of an acetal polymer and from 1 to about 50 weight percent of a butadiene or acrylate rubber-modified, two-phase polymer mixture. Such thermoplastic molding compositions are described as having considerably improved impact strength relative to that of the acetal polymer per se. Preferred embodiments of this reference utilize 80 to 95 weight percent of the acetal polymer component.

U.S. Pat. No. 4,639,488 to Schuette et al. discloses impact resistant polyacetal-based molding materials containing from 30 to 95 weight percent of an acetal polymer and from 5 to 70 weight percent of an emulsion polymerized elastomeric graft copolymer composed, on a graft copolymer weight basis, of from 60 to 90 weight percent of a butadiene-based core (or "grafting base") and from 10 to 40 weight percent of a grafted shell of a styrene and/or methylmethacrylate-based polymer or copolymer. Such molding materials are said to have high impact strength at low temperatures, to exhibit good thermal stability and to resist discoloration in the presence of light.

U.S. Pat. No. 4,179,479 to Carter discloses thermoplastic polymer blend compositions containing from 40 to 100 weight percent of a thermoplastic polyurethane in combination with up to 60 weight percent of a thermoplastic polymer which can be an ABS resin, an acetal resin, a polycarbonate resin, a polyester resin or mixtures thereof. Such compositions are also required to contain 0.5 to 10 weight percent of an acrylic polymer processing aid to improve the processability and molding characteristics thereof U.S. Pat. No. 4,117,033 to Gale discloses polymer blends containing an acetal resin in combination with from 0.1 to 5 weight percent of a low molecular weight copolyether-ester resin. Said copolyether-ester resin is said to improve the melt processability of the indicated acetal resin.

U.S. Pat. No. 4,683,267 to Lindner et al. discloses molding compounds consisting of a mixture of from 60 to 99.00 parts by weight of an acetal resin, from 0 to 40 parts by weight of an elastomer softening below the melting point of said acetal resin and from 0.01 to 40 parts by weight of an aliphatic, rubber-like, high molecular weight adipate-carbonate mixed ester. Elastomers said to be useful in the Lindner et al. blends include homopolymers and copolymers of alpha-olefins, homopolymers and copolymers of 1,3-dienes, copolymers and homopolymers of vinyl esters and copolymers and homopolymers of acrylate and methacrylate esters.

Another publication concerned with blends of polyacetal resins and polystyrene resins is Japanese Kokai No. 64-38463, published Feb. 8, 1989. Such publication is essentially concerned with polyacetal/polystyrene blends wherein the polyacetal constitutes the major portion by weight thereof and requires in all events that the ratio of the polyacetal melt flow rate (MFR, ASTM D-11238 at 190° C. and 2160 g) to the polystyrene melt flow rate (ASTM D-16238 at 200° C. and 5000 g) be from 5:1 to 100:1. According to such publication, excellent surface appearance is obtained by operating within, and only by operating within, the indicated range of polyacetal: polystyrene melt flow rate ratios. Also according to such publication, the polymer blends thereof optionally may contain small amounts of additional polymer ingredients such as a polyurethane resin, an olefinic homopolymer or copolymer resin, acrylate resins, polyamide resin, ABS resins or polyester resins.

Certain blends of rubber-modified styrenic copolymers such as ABS resins with polycarbonate resins are discussed and described in U.S. Pat. Nos. 4,526,926 and 4,624,986 (Weber et al.) and in U.S. Pat. Nos. 4,163,762 and 4,243,764 (Rudd). Not contemplated, however, by said patents are acetal resin-containing (or acetal resin and thermoplastic polyurethane or elastomeric copolyester-containing) blends as are provided in accordance with the present invention.

Published German application DE 3,802,753 A1 discloses polymeric molding materials containing homo- or copolyoxymethylene (POM), thermoplastic polyurethane elastomers (TPU), obtained by the reaction of aromatic di-isocyanates with linear polyols, and polyalkylene terephthalate resin. Such mixtures are described as being useful for applications in vehicles and electrical appliances and to provide improved impact resistance Preferred compositions are from 40–95 percent POM and from 5–60 percent of a mixture consisting of 60–98 percent TPU and 2–40 percent polyalkylene terephthalate.

There remains a continuing need to provide engineering thermoplastic materials having a balance of processability, good aesthetics with no pearlescence and having alternative, advantageous property profiles such as mechanical strength, impact resistance, environmental stress crack resistance, creep and chemical resistance and practical toughness as provided by the present invention.

SUMMARY OF THE INVENTION

In accordance with the foregoing, certain polymer blend compositions have now been developed having an advantageous combination of properties of the sort set forth above. Thus, the present invention, in one of its aspects, is a polymer blend composition comprising, on the basis of a total of 100 parts by weight of the stated polymer ingredients:

A. from about 1 to about 98 parts by weight of a monovinylidene aromatic copolymer ingredient selected from the group consisting of
1. non-rubber-modified monovinylidene aromatic copolymers comprising, in polymerized form and on an aromatic copolymer ingredient weight basis, from about 55 to about 99 weight percent of one or more monovinylidene aromatic monomers and from about 1 to about 45 weight percent of one or more relatively polar comonomer ingredients; and
2. rubber-modified monovinylidene aromatic copolymers comprising, in polymerized form and on a rubber-modified copolymer weight basis from about 30 to about 99 weight percent of one or more monovinylidene aromatic copolymer as described in item A. 1. above and from about 1 to about 70 weight percent of dispersed particles of a rubbery polymer having a glass transition temperature of 0° C. or lower:

B. from about 1 to about 98 parts by weight of an acetal homopolymer or copolymer ingredient which can be either linear or branched and which can be employed either singly or in combination: and C. from about 1 to about 98 parts by weight of a thermoplastic polycarbonate or polyester resin ingredient or a mixture thereof.

In one of its especially preferred embodiments, the indicated polymer blend composition further s from about 1 to about 70 (preferably from about 3 to about 60 and more preferably from about 5 to about 35) parts by weight of an elastomeric polymer selected from the group consisting of thermoplastic polyurethanes, copolyester elastomers and mixtures thereof. Particularly preferred elastomeric polymers for use within such embodiment are ester-containing or ester-based elastomeric materials (such as, for example, ester-based thermoplastic polyurethanes and copolyester elastomers) used either alone or in combination with each other or in combination with up to about 70 weight on a total elastomer weight basis of a non-ester-based elastomeric material such as, for example, an ether-based thermoplastic polyurethane.

In another especially preferred embodiment, the aforementioned polymer blend composition employs as its monovinylidene aromatic copolymer ingredient a rubber-modified monovinylidene aromatic copolymer comprising, on a rubber-modified copolymer weight basis, from about 2 to about 35 weight percent of dispersed particles of a rubbery polymer selected from the group consisting of homopolymers of a 1,3-conjugated alkadiene monomer and copolymers of from about 60 to about 99 weight percent of a 1,3-conjugated alkadiene monomer with from about 1 to about 40 weight percent of a monoethylenically unsaturated monomer.

In another preferred embodiment, the polymer blend compositions hereof further comprise from about 0.01 to about 5 weight percent, on a total composition weight basis, of an antioxidant and/or an ultraviolet light (U.V.) stabilizer ingredient selected from the group consisting of (a) light stabilizers comprising sterically hindered amines and/or ester functional groups such as, for example, bis (2,2,6,6-tetramethyl-4-piperidyl) sebacate (commercially available as TINUVIN ® 770 from Ciba Geigy): (b) light stabilizers comprising substituted benzo-triazoles such as, for example TINUVIN ® P and TINUVIN ® 234, (also commerically available from Ciba Geigy); and (c) antioxidant additives comprising p-hydroxyphenyl-propionic acid ester, such as, for example, tri-ethyleneglycol-bis-3(3-tert-butyl-4-hydroxy-5-methylphenyl) propionate which is available from Ciba Geigy as IRGANOX ® 245. Surprisingly, the presence of the indicated stabilizer/antioxidant ingredients serves to substantially increase the impact strength of the subject polymer compositions.

In yet another especially preferred embodiment hereof, the subject polymer blend compositions further comprise, on a total composition weight basis, from about 5 to about 80 weight percent of a particulate or fibrous inorganic filler or reinforcing ingredient such as, for example, fibers of carbon, graphite, glass and mica. Other mineral fibers such as fibers of titanium oxide or potassium titanate can also be, but are less preferably, employed. The most preferred fiber for use herein is glass fiber. Such filled or reinforced polymer blends (particularly when said blends employ fiberglass as the reinforcing agent at levels of from about 15 to 30 or 40 weight percent thereof) have been observed to exhibit unexpectedly enhanced thermal (e.g., heat distortion) performance.

The indicated polymer blends have a highly advantageous and controllable combination of physical, chemical and aesthetic properties including chemical resistance, creep resistance, impact and tensile strength, thermo/dimensional stability and environmental stress crack resistance and are useful for the preparation of molded articles in a wide variety of end-use applications including various interior and exterior automotive applications, household appliance applications, housings for electronic and/or business equipment and the like.

DETAILED DESCRIPTION OF THE INVENTION

As has been noted above, the polymer blend compositions hereof contain a monovinylidene aromatic copolymer ingredient which can either be rubber-modified or non-rubber-modified. In either case, suitable monovinylidene aromatic monomer constituents include styrene, alkyl substituted styrenes such as alpha-alkylstyrene (e.g., alpha-methylstyrene, alpha-ethylstyrene etc.), various ring-substituted styrenes such as para-methylstyrene, ortho-ethylstyrene, 2,4-dimethylstyrene, etc., ring-substituted halo-styrenes such as chlorostyrene, 2,4-dichloro-styrene, etc. and the like. Such monovinylidene aromatic monomer (especially styrene) typically constitutes from about 55 to about 99 weight percent of said monovinylidene aromatic copolymer and preferably constitutes from about 60 to about 95 (more preferably from about 65 to about 90) weight percent thereof. Such monovinylidene aromatic copolymers are typically normally solid, hard (i.e., non-elastomeric) materials having a glass transition temperature in excess of 25° C.

Suitable relatively polar comonomer ingredients for use as the minor constituent in (i.e., constituting from about 1 to about 45 weight percent of) the indicated monovinylidene aromatic copolymers include ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide, etc.; esters (especially lower, e.g., $C_1$–$C_6$, alkyl esters) of ethylenically unsaturated carboxylic acids such as methyl methacrylate, ethylacrylate, hydroxyethylacrylate, n-butyl acrylate or methacrylate, 2-ethyl-hexylacrylate, etc.; ethylenically unsaturated dicarboxylic acid imides such as N-alkyl or N-aryl maleimides such as N-phenyl maleimide, etc. Preferably said relatively polar comonomers or mixtures thereof constitute from about 5 to about 40 (more preferably from about 10 to about 35) weight percent of the indicated monovinylidene aromatic copolymer.

Especially preferred polymer blend compositions hereof are those wherein the monovinylidene aromatic copolymer is rubber modified and comprises on a total rubber modified-copolymer weight basis from about 1 to about 70 (preferably from 1 to about 40, more preferably from about 2 to about 35, and most preferably from about 3 to about 25 or 30) weight percent of dispersed particles of a rubbery polymer having a glass transition temperature of 0° C. or lower. Especially preferred rubbery polymers for use herein are those having a glass transition temperature of −20° C. or lower. Examples of suitable such rubbery polymers include homopolymers of 1,3-conjugated alkadiene monomers; copolymers of from about 60 to about 99 weight percent of said 1,3-conjugated alkadienes with from about 1 to about 40 weight percent of a monoethylenically unsaturated monomer such as, for example, monovinylidene aromatic monomers (e.g., styrene, etc.) and ethylenically unsaturated nitriles such as acrylonitrile, methacrylonitrile etc.; ethylene/propylene copolymer rubbers and rubbery ethylene/propylene/non-conjugated diene copolymers. Especially preferred rubbery copolymers for use herein include polymers composed of from about 60 to 100 weight percent of 1,3-butadiene and from 0 to about 40 weight percent of styrene or acrylonitrile.

One particular class of rubber-modified monovinylidene aromatic copolymer ingredients of interest for use herein are graft copolymer compositions wherein the above-discussed rubbery polymer particles serve as substrates having grafted thereto a portion of the above-described monovinylidene aromatic copolymer as a grafted superstrate and wherein the remainder of said monovinylidene aromatic copolymer constitutes a continuous matrix phase in which the indicated grafted rubbery particles are dispersed. In such instances, the matrix phase typically constitutes from about 40 to about 95 (preferably from about 60 to about 95) percent of the overall weight of the indicated rubber-modified compositions and the grafted copolymer constituents constitutes the remainder thereof. Typically the grafted copolymer constituent will have a grafted superstrate to graftable rubber substrate ratio (i.e., a graft to rubber or "G/R" ratio) of from about 0.1:1 to about 1:1 (preferably from about 0.35:1 to about 0.45:1).

Typically, the above-described rubber-modified monovinylidene aromatic copolymer ingredient will have a melt flow rate (MFR) of from about 0.5 to about 12 (preferably from about 1 to about 10) grams per 10 minutes as determined pursuant to ASTM D-1238 at 230° C. and 3.8 kg.

In certain especially preferred embodiments hereof, the dispersed rubbery polymer particles are of a sort which have a bimodal particle size distribution. For example, it has been observed that substantially higher impact strength is obtained within the polymer blend compositions of interest when the indicated rubbery particles are predominantly composed (e.g., from about 50 to about 90, preferably from about 65 to about 75, weight percent on a total rubbery particle weight basis) of particles having a volume average particle size of less than one micron (preferably from about 0.05 to about 0.8 micron) and wherein the remainder of said rubbery particles (e.g., from 10 to about 50, preferably from 25 to about 35, weight percent thereof) have a volume average particle size of about one micron or greater (preferably from about 1 to about 3 micron). The use of such bimodal rubber polymer particle has been found to give notably higher impact strength relative to comparable polymer blend compositions wherein the dispersed rubbery polymer particles are composed completely of rubber particles having sizes (i.e., diameters) of one micron or greater.

The aforementioned rubber-modified monovinylidene aromatic graft copolymer hereof can suitably be prepared in any known manner by free radical polymerization of the selected comonomer materials in the presence of the modifying rubber material. Suitable techniques thus include conventional mass, solution, suspension or emulsion polymerization processes. If emulsion polymerized graft copolymers are to be employed, care should be taken to remove or neutralize residual acid moieties. Otherwise decomposition of the acetal polymer component can result. Especially preferred for use herein are rubber-modified monovinylidene aromatic graft copolymers prepared via mass or mass/suspension polymerization techniques.

In general, mass polymerization involves polymerizing a solution of the rubber and monomer(s) at conditions sufficient to form discrete rubber particles of the desired particle size dispersed throughout the polymerized monomer. The polymerization is advantageously conducted in one or more substantially linear stratified flow or so-called plug-flow reactors such as described in U.S. Pat. No. 2,727,884 which may or may not comprise recirculation of a portion of the partially polymerized product or in a stirred tank reactor wherein the contents of the reactor are essentially uniform throughout.

The polymerization is advantageously conducted in an organic liquid reaction diluent such as aromatic or inertly substituted aromatic hydrocarbons (e.g., benzene or toluene) and in the presence of a free-radical initiator such as the peroxide initiators, (e.g., dibenzoyl peroxide or 1,1-bistertiary butylperoxycyclohexane). In general, the initiator will be employed in an amount from 100 to 5000 weight parts per million weight parts of the monomers employed. The organic liquid reaction diluent is generally employed to control the viscosity of the polymerization mixture and is generally employed in an amount from 2 to 20 weight percent based on the total weight of the rubber, monomer and diluent. The polymerization mixture can further contain other adducts such as a plasticizer or lubricant (e.g., mineral oil); and antioxidant (e.g., an alkylated phenol such as di-tert-butyl-p-cresol); a polymerization aid (e.g., a chain transfer agent such as an alkyl mercaptan) or a mold release agent, (e.g., zinc stearate). Temperatures at which polymerization is normally conducted are dependent on the specific components employed but will generally vary from 60° to 190° C.

In the preparation of the rubber-reinforced polymer resin, the mass polymerization can be continued to the desired completion and then treated to remove any unreacted monomer such as by flashing off the monomer and other volatiles at an elevated temperature under vacuum.

Mass/suspension polymerization involves initially mass polymerizing the monomer/rubber mixture and, following phase inversion (i.e., the conversion of the polymer from a discontinuous phase dispersed in a continuous phase of the rubber solution through the point where there is no distinct continuous or discontinuous phase in the polymerization mixture and to the point where there is a continuous polymer phase having the rubber dispersed therethrough) and subsequent size stabilization of the rubber particles, suspending the partially polymerized product, with or without additional monomer(s), in an aqueous medium which generally contains a polymerization initiator. Subsequently, polymerization is completed using suspension polymerization techniques.

In one preferred embodiment hereof, the above-described mass or mass/suspension-polymerized rubber-modified monovinylidene aromatic graft copolymer ingredient is employed in combination with a finely divided, emulsion polymerized particulate elastomeric material. Such particulate elastomeric materials typically have a volume average particle size in the range of from about 0.05 to about 0.5 (especially from about 0.15 to about 0.2) micron and, when employed, constitute from about 1 to about 15 percent by weight of the overall blend composition.

Such emulsion polymerized particulate elastomeric materials may be suitably prepared by emulsion polymerizing suitable monomers such as butadiene, isoprene or higher alkyl esters of acrylic acid or methacrylic acid, optionally in the presence of not more than 30 percent by weight of monomers, such as styrene, acrylonitrile, methyl acrylate, methyl methacrylate or any other monomer and polar comonomer described above.

Preferably such elastomeric materials contain adhesion promoting groups such as carboxyl, carboxamido, carboxylic anhydride or epoxide groups. This can be suitably achieved if acrylic or methacrylic acid, an amide of one of these, glycidyl acrylate or, instead of the free acid, tert.-butyl acrylate is used as a comonomer, in an amount of from 0.1 to 10 percent by weight. It is particularly advantageous if a shell which has a glass transition temperature of less than −10° C. and which contains such an adhesion promoting monomeric building block is grafted onto the indicated emulsion-polymerized elastomeric polymer. Graft monomers which have proven particularly useful are esters of acrylic acid, such as n-butyl acrylate, preferably in combination with multifunctional crosslinking agents and-/or with comonomers containing the stated adhesion promoting groups. Advantageously, the shell amounts to 10-50 percent by weight of the total elastomeric polymer.

As has been noted, the above-described monovinylidene aromatic copolymer ingredient generally constitutes from about 1 to about 98 weight percent) of the polymer blend compositions hereof. Preferably, said monovinylidene aromatic copolymer is employed in amounts corresponding to from about 5 to about 90 (more preferably from about 10 to about 75, especially from about 10 to about 65 and most preferably from about 15 to about 55) parts by weight per 100 parts of the combined or total weight of the overall polymer blend composition.

The acetal (sometimes termed polyoxymethylene) resin can be any of those commonly known in the art or commerically available. Thus the acetal resin either can be linear or branched and can be a copolymer or a homopolymer or mixtures of these. Copolymers can contain one or more comonomers such as those generally used in preparing acetal resins. Comonomers more commonly used include alkylene oxides of 2 to 12 carbon atoms, in a less than 20 wt. percent amount. Polyoxymethylenes which contain from 0.5 to 10 percent, in particular from 1 to 5 percent of ethylene oxide are particularly important commercially and are especially preferred for use herein. As a general rule, the available acetal resins have thermally stable terminal groups, such as ester or ether groups, for example acetate or methoxy groups. The polyoxymethylenes have, in general, a molecular weight of from about 10,000 to about 100,000. As an alternative to molecular weight, melt flow rate (MFR) is commonly used to characterize resins, and those with higher molecular weights have lower melt flow rates. Preferred acetal resins for use in the compositions of the present invention have MFRs of from about 0.1 to about 60 (preferably from about 0.5 to about 30 and most preferably from about 0.5 to about 5 or 10) grams/10 minutes, as measured pursuant to ASTM D-1238 at 190° C. and 2.16 Kg. If the MFR is too high, the melt viscosity of the acetal will be too low and it will be difficult to achieve sufficient intimate mixing of components at appropriate shear rates. If the MFR is too low, the temperature for the compounding operation may become too high and degradation can result. As will be evident in the examples, and assuming all other parameters are equal, the lower the MFR, the higher the toughness of the compositions of the present invention.

As noted above, the acetal polymer ingredient of the subject polymer blend compositions can generally constitute from about 1 to about 98 weight percent) of said polymer blend compositions. Preferably, said acetal polymer is utilized in an amount corresponding to from about 5 to about 90 (more preferably from about 10 to about 75, especially from about 15 to about 55 and most preferably from about 15 to about 40) parts by weight per 100 parts by weight of the total or combined weight of the indicated polymer blend composition.

In certain preferred embodiments hereof, it is desirable to employ the indicated acetal polymer ingredient in relatively larger proportions such as for example at levels ranging (on a per 100 parts by weight total polymer basis) from about 40 to about 90 (more preferably from about 45 to about 80 and most preferably from about 50 to about 75) parts by weight. These latter types of blend compositions are particularly beneficial in those instances wherein high heat distortion characteristics are desired.

As has been noted above, the third requisite thermoplastic resin ingredient for use herein is a polyester or polycarbonate thermoplastic resin material and mixtures thereof. Polycarbonate resins suitable for use herein can be described as being aromatic polycarbonates which contain the repetitive carbonate group,

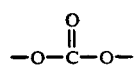

and which have a divalent aromatic radical attached to said carbonate group. Preferably, the polycarbonate can be characterized as possessing recurring structural units of the following formula and structural isomers thereof:

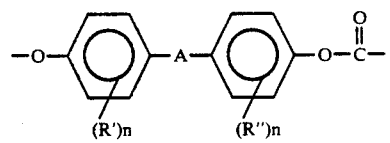

wherein A is a single bond or is a divalent aliphatic radical such as an alkylene or an alkylidene radical usually with 1-7 carbon atoms, or a cycloalkylene or cycloalkylidene radical usually with 5-15 carbon atoms, with all including their aromatically and aliphatically substituted derivatives. In other variations of the polycarbonate resin, A can also represent —O—, —S—, —CO—, —SO— or —SO$_2$—. In the indicated structural formula, R' and R" are substituents other than hydrogen such as, for example, halogen or a saturated or unsaturated monovalent aliphatic radical having usually 1-7 carbon atoms, and n equals 0 to 4.

Typical of the above-mentioned structural unit are those which result from the reaction of phosgene (or other carbonyl-providing species) with bis-(hydroxyphenyl) alkanes, bis (hydroxyphenyl) cycloalkanes, bis (hydroxyphenyl) sulphides, bis (hydroxyphenyl) ethers, bis (hydroxyphenyl) ketones, bis (hydroxyphenyl) sulphoxides, bis-(hydroxyphenyl) sulphones, α, α'-bis (hydroxyphenyl)-isopropylbenzene, bis (3,5-bromo-4-hydroxyphenyl) sulfone, bis (tetrabromo-4-hydroxyphenyl) propane, bis-(3,5,6-trichloro-2-hydroxyphenyl) methane, 2,2'-chloro-4,4'-cyclohexylidene phenol, tetrachlorohydroquinone and chloroethylene phenol. Further possible structural units are those which result from bis-(3,5-methyl-4-hydroxyphenyl) propane, 4,4'-bis (4-hydroxy-phenylthio) phenylsulfone and phenophthalein.

It is understood, of course, that the carbonate polymer may be derived from two or more different hydric phenols or a copolymer of a hydric phenol with a glycol if a copolymer carbonate rather than a carbonate homopolymer is desired. Also suitable for the practice of this invention are blends of any of the above carbonate polymers.

Also included in the term "polycarbonate polymer" are the ester carbonate copolymers of types described in U.S. Pat. Nos. 3,169,121; 4,330,662 and 4,105,633. Typical comonomers are dicarboxylic acid, for example, terephthalate.

Additionally included in the scope of this invention are so-called "branched polycarbonates" which are made by using the above-described polyhydric monomers in combination with a suitable branching agent, normally tri- or higher polyfunctional molecules.

Suitable polyhydric reactants for use in preparing various polycarbonate resins are also described, in U.S. Pat. Nos. 3,062,781; 2,970,131 and in German Offenlegungsschrift Nos. 1,570,703; 2,211,956 and 2,211,957.

The polycarbonate resins employed herein preferably have a melt flow rate, measured according ASTM D-1238 (condition O:300° C., 1.2 kg load), of from about 0.5 to about 200 g/10 min, preferably from about 2.5 to about 100 g/10 min, more preferably from about 5 to 90 g/10 min, and especially preferred from about 8 to about 75 g/10 min.

Thermoplastic polyester resin components suitable for use herein are those which are obtained by reaction of glycol and dicarboxylic acid such as, for example, as are described in U.S. Pat. No. 2,465,319.

The glycol preferably has the general formula:

$$HO—(CH_2)_n—OH$$

in which n is an integer from 2 to 12, such as for example ethylene glycol, 1,2- or 1,3-propane diol, 1,2-, 1,3- or 1,4- butane diol, 1,5- or 1,4-pentane diol, 1,6-hexane diol, 1,7- heptane diol or 1,8-octane diol. In other preferred cases cycloaliphatic diols, typically containing up to 21 carbon atoms, are employed, such as, for example, cyclohexane-1,4-dimethanol, 2,2-bis-(4-hydroxycyclohexyl) propane, 2,4-dihydroxy-1,1,3,3-tetramethyl cyclobutane and 2,2-bis-(3-β-hydroxyethoxyphenyl)-propane.

Dicarboxylic acid components suitably employed to prepare said polyester resins include those having the general formula

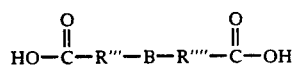

with R''' and R'''' each representing the —(CH$_2$)$_m$-group, with m being zero or an integer from 1 to 4. B is a divalent aromatic radical represented by the following formulas or structural isomers thereof:

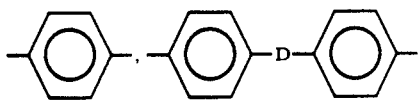

or a cyclo aliphatic group. D may be:

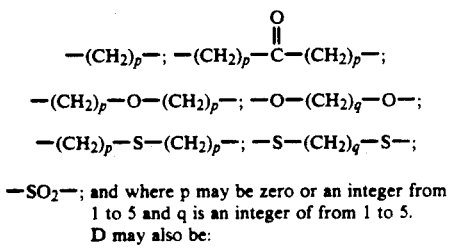

—SO$_2$—; and where p may be zero or an integer from 1 to 5 and q is an integer of from 1 to 5.
D may also be:

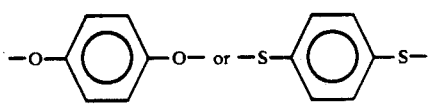

and structural isomers thereof.

Typical dicarboxylic acids include phthalic acid, isophthalic acid, naphthalene-2,6-dicarboxylic acid, 4,4'-diphenyl dicarboxylic acid, succinic acid, adipic acid, sebacic acid, azelaic acid and cyclohexane diacetic acid.

The polyester resin obtained from reaction of the indicated dicarboxylic acid and a glycol may be branched by incorporation of relatively small quantities of tri-or tetrahydric alcohols or tri- or tetrabasic polycarboxylic acids of the type described, for example, in German Offenlegungsschrift No. 1,900,270 and in U.S. Pat. No. 3,692,744.

In addition to the homopolymer derived from one type of dicarboxylic acid and one type glycol, copolymer resins are often preferred, polymerized from a combination of one or more dicarboxylic acids and a combination of one or more glycols. Such a product, made from terephthalic acid, and a combination of cyclohexane dimethanol and ethylene glycol is commerically available from Eastman Laboratories under the tradename KODAR PETG ( TM ) Copolyester.

The homo- and copolyesters derived from dicarboxylic acid and glycol have preferably a molecular weight ranging from 5,000 to 200,000, more preferably from 10,000 to 60,000.

In certain polymer blend compositions, mixtures of various thermoplastic polyester and/or polycarbonate resins are preferred, comprising such as, for example, polycarbonate and polyethylene glycol terephthalate or polybutylene glycol terephthalate or any other combination of the various polyester and polycarbonate resins mentioned above.

The indicated thermoplastic polyester or polycarbonate resin ingredient hereof can generally be employed in amounts ranging from about 1 to about 98 parts by weight thereof per 100 parts by weight of the subject polymer blend compositions. Preferably, said ingredient is employed in an amount corresponding to from about 5 to about 90 (more preferably from about 10 to about 75, especially from about 20 to about 45 or 55) parts of the combined weight of the polymers contained within the subject polymer blend composition.

Elastomeric materials suitable for use herein include, as noted above, thermoplastic polyurethanes and elastomeric copolyester materials. Thermoplastic polyurethanes suitable for use herein include any of those generally known in the art and thus include those prepared from a diisocyanate, a polyester, polycaprolactone or polyether and a chain extender. Such thermoplastic polyurethanes are substantially linear and maintain thermoplastic processing characteristics.

A preferred group of polyether-based polyurethanes used in the polymer blend composition of the present invention are the reaction products of: (i) 4,4'-methylene bis(phenyl isocyanate), (ii) a polyether polyol (such as for example, a poly (oxy-1,2 propylene) glycol or a polyoxytetramethylene glycol) having a number average molecular weight within the range of about 600 to about 3000 (preferably from about 1000 to about 2500) and (iii) chain extending agent such as diol extenders selected from the group consisting of aliphatic straight chain diols having from 2 to about 6 carbon atoms, bis(2-hydroxy-ethyl) ether of hydroquinone, bis(2-hydroxy-ethyl) ether of resorcinol, and mixtures of any two or more of such diol extenders and/or other difunctional chain extending agents containing 2 active hydrogen-containing groups which are reactive with isocyanate groups.

Suitable chain extending agents for use herein may include any difunctional compounds containing two active hydrogen-containing groups which are reactive with isocyanate groups. Examples of such suitable chain extending agents thus include diols including ethylene glycol, propylene glycol, butylene glycol, 1,4-butanediol, butenediol, butynediol, xylylene glycols, amylene glycols, 1,4-phenylene-bis-$\beta$-hydroxyethyl ether, 1,3-phenylene-bis-$\beta$-hydroxy ethyl ether, bis-(hydroxymethyl-cyclohexane), hexanediol, thiodiglycol and the like; diamines including ethylene diamine, propylene diamine, butylene diamine, hexamethylene diamine, cyclohexalene diamine, phenylene diamine, toluylene diamine, xylylene diamine, 3,3'-dichlorobenzidine, 3,3'-dinitrobenzidine and the like: alkanol amines such as, for example, ethanol amine, aminopropyl alcohol, 2,2-dimethyl propanol amine, 3-aminocyclohexyl alcohol, p-aminobenzyl alcohol and the like. If desirable, a small amount of polyfunctional material may be utilized. This polyfunctional chain extender, however, should not be present in an amount greater than about 1 percent by weight. Any suitable polyfunctional compound may be used for such purpose such as, for example, glycerine, trimethylolpropane, hexanetriol, pentaerythritol and the like.

As used herein, the term "aliphatic straight chain diols having from 2 to about 6 carbon atoms" means diols of the formula HO(CH$_2$)n OH wherein n is 2 to about 6 and there is no branching in the aliphatic chain separating the OH groups. The term is inclusive or ethylene glycol, 1,3-propanediol, 1,4-butanediol, 1,5-pentanediol and 1,6-hexanediol. Preferred diol extenders for use herein include 1,4-butanediol, 1,6-hexanediol and the bis(2-hydroxy-ethyl) ether of hydroquinone; an especially preferred diol extender being 1,4-butanediol.

Other diisocyanates which may be used in place of or in combination with the preferred species mentioned above [i.e., 4,4'-methylene bis (phenyl isocyanate)] include ethylene diisocyanate, ethylidene diisocyanate, propylene diisocyanate, butylene diisocyanate, cyclopentylene-1,3-diisocyanate, cyclohexylene-1,4-diisocyanate, 2,6-tolylene diisocyanate, 2,2-diphenylpropane- 4,4'-diisocyanate, P-phenylene diisocyanate, m-phenylene diisocyanate, xylylene diisocyanate, 1,4-naphtylene diisocyanate, 1,5-naphthylene diisocyanate, diphenyl-4,4'-diisocyanate, azobenzene-4,4'diisocyanate, diphenyl sulfone-4,4'diisocyanate, dichlorohexamethylene diisocyanate, tetramethylene diisocyanate, pentamethylene diisocyanate, hexamethylene diisocyanate, 1-chlorobenzene-1,4-diisocyanate, furfurylidene diisocyanate and the like.

The polyether polyol and chain extending agent are typically used in the polyurethane reaction medium in a ratio of about 0.5 to about 2.5 equivalents (e.g., mole equivalents) of the chain extender per equivalent of the polyol. Preferably, the equivalents ratio is from about 1 to about 2. Most preferably the ratio is from about 1.2 to about 1.6 equivalents of extender per equivalent of the polyol when said polyol has a molecular weight of about 2000, and especially when the extender is an aliphatic straight chain diol. When the aforementioned hydroquinone or resorcinol extender are used, the equivalents ratio may be lower than the above-mentioned preferred ranges, for example, as low as about 0.5 equivalents of the extender per equivalent of the polyol.

In preparing the foregoing polyether-based polyurethanes, the polyether polyol and the chain extender and the diisocyanate are typically used in relative proportions to each other such that the overall ratio of isocyanate equivalents or groups to total hydroxyl equivalents or groups or other active hydrogen-containing groups (i.e., polyol plus extender) is within the range of about 1:1 to about 1.08:1.0 and preferably is within the range of about 1.02:1.0 to about 1.07:1.0. The most preferred ratio of isocyanate (NCO) groups to total hydroxyl (OH) groups (or combined hydroxyl plus other active hydrogen groups) is within the range of from about 1.03:1.0 to about 1.06:1.0.

The term equivalent(s) as used with respect to the polyurethane preparation herein is based on the hydroxyl (or other active hydrogen) groups and the isocyanate groups within the reactants.

Suitable techniques for the preparation of the aforementioned polyether-based thermoplastic polyurethanes are known in the art and are discussed, for example, within the teachings in Columns 4-6 of U.S. Pat. No. 4,665,126 to Kusumgar et al., said teachings being hereby incorporated herein by reference thereto.

The polyether-based thermoplastic polyurethanes employed in the practice of the present invention are typically characterized by a ClashBerg modulus ($T_f$) which is less than about $-10°$ C. The $T_g$ (glass transition temperature) of the polyurethanes is essentially the same value. The polyether-based polyurethanes may suitably have, for example a Shore A Hardness of 95A or less, and a weight average molecular weight in excess of 100,000.

A preferred group of thermoplastic polyester-based polyurethanes for use in the present invention are the reaction products of: (i) 4,4'methylenebis(phenyl isocyanate; (ii) a polyester of adipic acid and a glycol having at least one primary hydroxyl group; and (iii) a difunctional chain extender of the sort described above having 2 active hydrogen-containing groups which are reactive with isocyanate groups.

In preparing the polyester precursor of this group of polyurethanes the adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water content is from about 0.01 to about 0.02 percent preferably from about 0.01 to 0.05 percent.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like. In addition to the glycols, a small amount of trihydric alcohol up to about 1 percent may be used along with the glycols such as, for example, trimethylolpropane, glycerine, hexanetriol and the like. The resulting hydroxyl polyester has a molecular weight of at least about 600, a hydroxyl number of about 25 to about 190 and preferably between about 40 and about 60, and an acid number of between about 0.5 and about 2 and a water content of 0.01 to about 0.2 percent.

Any suitable chain extending agent including those described above for the polyether-based thermoplastic polyurethanes) having active hydrogen containing groups reactive with isocyanate groups may be used in preparing the subject polyester-based materials. Examples of such extenders thus include diols such as ethylene glycol, propylene glycol, butylene glycol, 1,4-butanediol, butenediol, butynediol, xylylene glycols, amylene glycols, 1,4-phenylene-bis-$\beta$-hydroxyethyl ether, 1,3-phenylene-bis-$\beta$-hydroxy ethyl ether, bis-(hydroxymethyl-cyclohexane), hexanediol, thiodiglycol and the like. Moreover, polyether polyols may also be employed as the chain extending agent (or as a portion thereof) with the result being a copolyester/polyether based thermoplastic polyurethane which is also suitable for use in the practice of the present invention.

Although thermoplastic polyurethanes based upon adipate polyesters are generally preferred for use herein, other polyester-based thermoplastic polyurethanes can also be suitably employed within the present invention such as, for example, those in which there is employed (in place of the adipic acid) succinic acid, suberic acid, sebacic acid, oxalic acid, methyl adipic acid, glutaric acid, pimelic acid, azelaic acid, phthalic acid, terephthalic acid, isophthalic acid and the like as well as those prepared using hydroxycarboxylic acids, lactones, and cyclic carbonates such as $\epsilon$-caprolactone and 3-hydroxy-butyric acid in place of the adipic acid component. Similarly polyester-based thermoplastic polyurethanes prepared using the above-described alternative diisocyanates in place of 4,4'-methylene bis (phenyl isocyanate) can also be suitably employed in the practice of the present invention.

The aforementioned types of polyester-based thermoplastic polyurethanes are generally known materials. Suitable methodology for the preparation thereof is disclosed within Column 7 of U.S. Pat. No. 4,665,126 and is incorporated herein by reference.

Especially preferred thermoplastic polyurethanes for use herein include those having a Shore hardness (ASTM D2240) between about 70 on the "A" scale and 60 on the "D" scale.

If desired, the thermoplastic polyurethane employed in the practice of the present invention can have incorporated in it additives such as pigments, fillers, lubricants, stabilizers, antioxidants, coloring agents, fire retardants, and the like, which are commonly used in conjunction with polyurethane elastomers.

Elastomeric polymer ingredients suitable for use herein also include polyester-based elastomers other than the ester-based polyurethane materials which have been discussed above. Examples of such other elastomers include elastomeric copolyether-ester resin material and elastomeric adipate-carbonate mixed ester resin materials.

Suitable copolyether-ester elastomer ingredients can be generally described as comprising a multiplicity of recurring intralinear long-chain and short-chain ester units connected head-to-tail through ester linkages, said long chain ester units generally constituting from about 25 to about 85 weight percent of said copolyether-ester elastomer and corresponding to the formula:

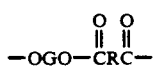

wherein

G is a divalent radical remaining after removal of terminal hydroxyl groups from a poly-(alkylene oxide) glycol having a carbon-to-oxygen mole ratio of about 2–4.3 and a molecular weight of about 400–6000; and R is a divalent radical remaining after removal of carboxyl groups from a dicarboxylic acid having a molecular weight less than about 300; and said short chain ester units generally constituting from about 15 to about 75 weight percent of said elastomer and corresponding to the formula:

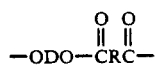

wherein

D is a divalent radical remaining after removal of hydroxyl groups from a low molecular weight diol having a molecular weight less than about 250; and R is as defined above.

Preferably, the indicated polyether-ester elastomers have a relatively low molecular weight as evidenced by their exhibiting an inherent viscosity of about 0.05–0.95 (preferably from about 0.1 to about o.8 and most preferably from about 0.1 to 0.5) when measured in m-cresol at a 0.1 g/dl concentration at 30° C.

A more detailed description of the aforementioned polyether-ester elastomers (including preferred embodiments thereof, preparation methodology, the use of small amounts of the low molecular weight materials as a processing aid for polyacetal resins and the use, as per German Patent 2,449,343, of higher molecular weight versions as impact modifiers for polyacetal resins) is presented within U.S. Pat. No. 4,117,033 to Gale, the disclosure of which is hereby incorporated by reference.

Suitable elastomeric adipate-carbonate mixed ester materials for use herein include those described within U.S. Pat. No. 4,683,267 to Lindner et al. for use as property modifiers for polyoxymethylene resin-based molding compositions. Such materials are rubber-like high molecular weight compounds corresponding to the formula

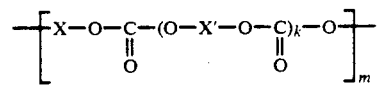

wherein

X and X' represent residues of the reaction product of a polyhydric alcohol and adipic acid having a molecular weight of from 800 to 3,500;

k represents an integer of from 0 to 10; and m represents an integer greater than 20, preferably from 22 to 100; which compounds have a limiting viscosity number [η] (Staudinger Index) in tetrahydrofuran of from 0.8 to 2.5 dl/g.

The following are examples of polyhydric alcohols which may be used, optionally as mixtures, for the polyesters from which the residues X and X' are derived: ethylene glycol, propylene glycol-(1,2) and - (1,3), butylene glycol-(1,4) and -(2,3), hexane diol- (1,6), octane diol-(1,8), neopentyl glycol, cyclohexane dimethanol, 1,4-bis-(hydroxymethyl cyclohexane), 2-methyl-1,3-propane diol, diethylene glycol, triethylene glycol, tetraethylene glycol, dipropylene glycol and dibutylene glycol.

The reaction products obtained from adipic acid and the alcohols are polyesters having hydroxyl end groups. The molecular weights thereof range from about 800 to about 3,500. The adipate-carbonate mixed esters are prepared from these polyesters by a reaction with difunctional carbonic acid aryl esters. These correspond in particular to the following general formula:

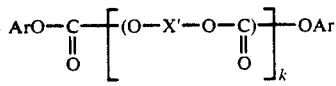

wherein

Ar represents a substituted or unsubstituted aryl group having from 6 to 18 carbon atoms, preferably 6 carbon atoms; and k and X' are as defined above.

Further details concerning preferred embodiments of the indicated adipate-carbonate mixed esters and concerning suitable techniques for the preparation thereof are contained in the indicated Lindner et al. patent and are incorporated herein by reference thereto.

As has been noted above, when the above-described elastomeric polymer ingredients are generally employed within the subject polymer blends hereof, they are typically utilized in an amount ranging from about 1 to about 70 (preferably from about 3 to about 60) parts by weight per 100 parts of the combined weight of the stated polymer ingredients. In certain preferred embodiments, said elastomeric ingredient is employed in amounts ranging from about 3 to about 40 (especially from about 5 to about 30 and most preferably from about 10 to about 25) parts by weight per 100 parts by weight of the total polymer ingredients.

In some instances, it is preferred that the elastomeric ingredient be employed at relatively lower levels such as, for example, in amounts of from about 3 to about 25 (preferably from about 5 to about 25 and especially from about 10 to about 20 or 25) parts by weight on a 100 parts total polymer weight basis.

In other cases, as for example when a more elastomeric character is desired in the subject blend composition, it is preferred that the indicated elastomeric ingredient be employed in amounts ranging from about 20 to about 60 or 70 (more preferably from about 20 or 25 to about 35 or 40) parts by weight per 100 parts total weight of the specified polymer ingredients.

In those instances wherein relatively low levels (e.g., from about 3 to about 20 or 25 parts by weight/100 parts total polymer) of the elastomeric ingredient is to be employed, it has been found to be especially advantageous and preferred to either employ one or more of the above-described ester-containing or ester-based elastomeric materials (especially the ester-based thermoplastic polyurethane) either alone or in combination with each other as the elastomeric ingredient or to employ, on a total elastomeric ingredient weight basis, at least about 30 weight percent (preferably about 50 weight percent or more) of such an ester-based or ester-containing elastomer in combination with up to about 70 weight percent (preferably about 50 weight percent or less) of an ether-based thermoplastic polyurethane material.

On the other hand, in those cases where a relatively larger amount(such as, for example, and on a 100 parts by weight total polymer basis, from about 20 or 25 to about 40 or 70 parts by weight) of the elastomeric material is to be employed, it has been found that elastomeric materials which are somewhat less effective and/or desirable for use as the sole elastomeric ingredient at low usage levels can in fact be more satisfactorily employed as the sole elastomeric ingredient at said higher usage levels.

The polymer blend compositions hereof are conveniently prepared by dry blending the individual polymer ingredients to be employed in particulate (e.g., pelletized) form and in the quantitative proportions desired in a given instance and thereafter melt compounding the particulate polymer mixture in accordance with known extrusion compounding techniques. In connection with the indicated melt compounding operation, it is generally preferred to conduct such operation at a temperature of not exceeding 240° C., especially at a melt temperature in the range of from about 180° to about 230° C.

Various optional additives may also be included in the polymer blend compositions hereof for different purposes as well known in the art, including bisphenol-type, ester-type or hindered phenol-type additives and anti-oxidants as disclosed, for example, in U.S. Pat. Nos. 3,103,499 and 3,240,753, amine and amidine as disclosed, for example, in U.S. Pat. Nos. 3,313,767 and 3,314,918, nucleants, UV screens and absorbers, metal soaps, glass beads, talc, polymeric substances other than those critical to this invention such as additives commonly known as mold release agents, plasticizers, antistatic agents, etc. which are compatible with the blends and color pigments which are compatible with acetal polymers. However, the use of the mentioned additives is not considered to be necessary for the operability of present invention.

With regard to the aforementioned optional additive materials, it is important to note that a surprising phenomenon has been discovered in the context of the subject polymer blends in that the addition of a minor amount (e.g., from about 0.01 to about 5, preferably from about 0.05 to about 1.5 and especially from about 0.1 to about 1.0 weight percent) of certain selected antioxidant and/or U.V. stabilizer ingredients has been found to unexpectedly also provide dramatically increased impact strength within the polymer blend compositions of concern. In particular, U.V. light stabilizers comprising sterically hindered amines and/or ester functional groups as well as substituted benzotriazoles (for example TINUVIN ® 770 and 234) and anitoxidants comprising p-hydroxyphenyl propionic acid esters (for example IRGANOX ® 245) have been found to be effective in this regard. Especially preferred in this connection are compositions which employ from about 0.1 to about 0.5 weight percent of TINUVIN ® 234 and/or from about 0.1 to about 1.0 weight percent of TINUVIN ® 770 and particularly when one or both of the former are used in combination with from about 0.1 to about 0.5 weight percent of IRGANOX ® 245.

The polymer blend compositions hereof preferably also contain a minor proportion (e.g., from about 0.01 to about 15 parts by weight per 100 parts by weight of the overall blend composition) of one or more oxirane or substituted oxirane-containing ingredients. In this regard, it can be noted that the inclusion of oxirane or substituted oxirane-containing ingredients has been found to substantially improve the color stability of the subject polymer blends during the melt processing (e.g., melt blending and/or injection molding) thereof and to thereby widen the processability window of such blends by allowing increased processing temperatures to be employed without encountering discoloration problems.

Another phenomenon which has been observed in connection with the polymer blends hereof relates to the glass fiber reinforcement thereof. Specifically, it has been found that compounded fiberglass reinforced polymer blend compositions hereof (e.g., containing from about 5 to about 80 weight percent glass fiber on a total composition weight basis can have unexpectedly enhanced thermal stability characteristics (e.g., heat distortion temperatures) and also that said phenomenon is particularly pronounced and beneficial at fiberglass contents of from about 15 to about 60 (especially from about 20 to about 50) weight percent on a total composition weight basis and at acetal polymer to monovinylidene aromatic copolymer weight ratios of from about 25:75 to about 50:50.

The polymer blend compositions of the present invention have good processability characteristics and are suitable for use in a wide variety of injection molding applications. Such compositions are particularly useful in such applications wherein good thermal/dimensional stability, creep resistance and chemical resistance properties are required and have also been found to be paintable. Suitable exemplary end-use applications thus include automotive interior and exterior parts, tool casings, appliance housings and the like.

The present invention is further understood and illustrated by reference to the following examples thereof. The various thermoplastic resins employed within such examples are identified and described in Table A.

TABLE A

| Resin Abbrev. | Resin Identification |
|---|---|
| POM-1 | ULTRAFORM ® H2320, Acetal Copolymer (BASF), MFR = 2.5 g/10 min (190° C., 2.16 kg) |
| POM-2 | CELCON ® M-25, Acetal Copolymer (CELANESE), MFR = 2.5 g/10 min (190° C., 2.16 kg) |
| POM-3 | CELCON ® M-90, Acetal Copolymer (CELANESE), MFR = 9.0 g/10 min (190° C., 2.16 kg) |
| ABS-1 | a butadiene rubber modified styrene acrylonitrile copolymer having a MFR of 3.3 g/10 min (230° C., |

TABLE A-continued

| Resin Abbrev. | Resin Identification |
|---|---|
| | 2.8 kg) and containing 16 weight percent acrylonitrile and 12 weight percent polybutadiene (1.2 micron volume average particle size) (THE DOW CHEMICAL COMPANY) |
| ABS-2 | similar to ABS-1 except that it has a MFR of 1.6 g/10 min (230° C., 2.8 kg) (THE DOW CHEMICAL COMPANY) |
| ABS-3 | a butadiene rubber modified styrene acrylonitrile copolymer with 20 weight percent acrylonitrile and 15 weight percent butadiene rubber having a bimodal volume average particle size distribution of 1.2 and 0.6 micron and approximately 2.5 weight percent butyl acrylate (THE DOW CHEMICAL COMPANY) |
| PC-1 | CALIBRE ® 300-4, Polycarbonate with a MFR of 4 g/10 min (300° C., 1.2 kg) (THE DOW CHEMICAL COMPANY) |
| PC-2 | CALIBRE ® 300-10, Polycarbonate with a MFR of 10 g/10 min (300° C., 1.2 kg) (THE DOW CHEMICAL COMPANY) |
| PC-3 | CALIBRE ® 300-15, Polycarbonate with a MFR of 15 g/10 min (300° C., 1.2 kg) (THE DOW CHEMICAL COMPANY) |
| PC-4 | CALIBRE ® 300-20, Polycarbonate with a MFR of 20 g/10 min (300° C., 1.2 kg) (THE DOW CHEMICAL COMPANY) |
| PC-5 | CALIBRE ® 300-22, Polycarbonate with a MFR of 22 g/10 min (300° C., 1.2 kg) (THE DOW CHEMICAL COMPANY) |
| PC-6 | XU 73054.00L experimental Polycarbonate with a MFR of approximately 75 g/10 min (300° C., 1.2 kg) (THE DOW CHEMICAL COMPANY) |
| PC-7 | XU 73088, experimental Polyester Polycarbonate (THE DOW CHEMICAL COMPANY) |
| PC-8 | MERLON ® HMS3118, branched Polycarbonate (MOBAY CHEMICAL) |
| M-PBT | RYNITE ® RE 6400, Polybutyleneterephthalate impact modified with acrylate rubber (DU PONT) |
| PETG | KODAR ® PETG 6763, Copolyester (EASTMAN LABORATORIES) |
| TPU-1 | PELLETHANE ® 2355-80A, Thermoplastic poly urethane (THE DOW CHEMICAL COMPANY) |

Examples 1–5 and Comparative Examples A–D

In these examples, a series of 4 component blends are prepared, comprising acetal resin (POM), butadiene rubber modified styrene acrylonitrile copolymer (ABS), thermoplastic polyurethane (TPU) and a polycarbonate (PC) resin component.

The polycarbonate resin employed is in all cases a homopolymer of bisphenol-A, varying from high molecular weight (low melt flow rate) to a low molecular weight (high melt flow rate).

The Comparative Examples A–D are polycarbonate/ABS blends, having a ratio of approximately 60:40 parts by weight of PC:ABS, modified with approximately 3 weight percent of methyl methacrylate butadiene styrene (MBS) core-shell rubber to improve the low temperature impact performance thereof. The blends are prepared using the same ABS and polycarbonate homopolymer resins as in Examples 1–5 and additionally a very low melt flow rate resin (i.e., PC-1).

In preparing the indicated 4 component blends the individual blend components, in pelletized form, are weighed out and combined in the desired proportions, tumble blended for 15 minutes melt compounded using a BUSS Ko-Kneader operated at approximately 220°–250° C., 20 kg throughput and pelletized for subsequent drying and injection molding (at 180°–250° C.) into appropriate testing specimens.

The results of physical property testing and the compositional make-up of the 4 component blends in question, are summarized in Table I. The data for the Comparative Examples are given in Table II.

As can be seen from Table I, the blend compositions of Examples 2–5 exhibit exceptionally high room temperature Izod impact strength. Surprisingly, it is additionally found that impact strength is generally improved as the melt flow rate of the polycarbonate resin is increased (i.e., corresponding to decreasing molecular weight). This is surprising since exactly the opposite trend is observed with the MBS rubber-modified polycarbonate/ABS blends. (See the Comparative Examples in Table II which demonstrate a substantial reduction in the impact strength of the comparative blends when relatively higher melt flow rate polycarbonate is used in place of the low melt flow rate polycarbonate resin.)

TABLE I

| Compositon (Wt. %) | Test Methods | 1 | 2 | 3 | 4 | 5 |
|---|---|---|---|---|---|---|
| POM-2 | | 30 | 30 | 30 | 30 | 30 |
| ABS-1 | | 23 | 23 | 23 | 23 | 23 |
| PC-2 | | 30 | | | | |
| PC-3 | | | 30 | | | |
| PC-4 | | | | 30 | | |
| PC-5 | | | | | 30 | |
| PC-6 | | | | | | 30 |
| PC MFR[1] (g/10 min) | ISO 1238 | 10 | 15 | 20 | 22 | 75 |
| TPU-1 | | 17 | 17 | 17 | 17 | 17 |
| VICAT (°C.)[2] | ISO 306 | 137 | 136 | 124 | 134 | 129 |
| HDT (°C.)[3] | ISO 75 | 76 | 76 | 78 | 78 | — |
| Notched IZOD RT[4] (kJ/m$^2$) | ISO 180 | 21 | >120 | >120 | >120 | >120 |
| Notched IZOD −40° C.[5] (kJ/m$^2$) | ISO 180 | 13 | 11 | 14 | 17 | 14 |
| Notched CHARPY[4] (kJ/m$^2$) | ISO 179 | 9 | 20 | 31 | 22 | 26 |
| Flexural Modulus (MPa) | DIN 53457 | 1620 | 1700 | 1770 | 1720 | 1770 |

[1]MFR = Melt Flow Rate, determined at 300° C. and 1.2 kg.
[2]Vicat softening temperature measured at 120° C./hour, 1 kg load.
[3]Heat Distortion Temperature measured at 120° C./hour and 1.82 MPa load.
[4]Room Temperature data.
[5]Izod data at −40° C.

TABLE II

| Compositon* | Test Methods | Comparative Examples | | | |
|---|---|---|---|---|---|
| | | A | B | C | D |
| Polycarbonate Used | | PC-1 | PC-2 | PC-3 | PC-5 |
| PC MFR[1] (g/10 min) | ISO 1238 | 4 | 10 | 15 | 22 |

TABLE II-continued

| Compositon* | Test Methods | Comparative Examples | | | |
|---|---|---|---|---|---|
| | | A | B | C | D |
| Notched IZOD RT[4] (kJ/m$^2$) | ISO 180 | 83 | 68 | 62 | 60 |
| Notched IZOD-30° C.[7] (k/J/m$^2$) | ISO 180 | 70 | 60 | 56 | 42 |
| Notched CHARPY[4] (kJ/m$^2$) | ISO 179 | 40 | 28 | 32 | 28 |

[1] and [4]See Table I
[7]Izod Data at −30° C.
*PC:ABS weight ratio = 60:40 and containing 3 weight percent MBS rubber.

Examples 6-12

In these examples, a series of 4 component ABS/acetal resin (POM)/polycarbonate resin (PC)/thermoplastic polyurethane resin (TPU) blends are prepared generally in accordance with the procedure described in Examples 1-5 above. The results of the physical property testing and the compositional make-up of the 4 component blends in question, are summarized in Table III.

The data given for the thermal stability, mechanical performance and the impact demonstrate the excellent performance profile of the blends, prepared with various composition ratios.

TABLE III.

| Compositon (Wt. %) | Test Methods | Examples | | | | | | |
|---|---|---|---|---|---|---|---|---|
| | | 6 | 7 | 8 | 9 | 10 | 11 | 12 |
| POM-1 | | | 20 | | | 21 | 40 | 30 |
| POM-2 | | 70 | | 10 | 20 | | | |
| ABS-1 | | 10 | 40 | 10 | 15 | 26 | 20 | 10 |
| PC-3 | | 10 | 20 | 75 | 15 | 40 | 20 | 50 |
| TPU-1 | | 10 | 20 | 5 | 50 | 13 | 20 | 10 |
| VICAT (°C.)$^2$ | ISO 306 | 155 | 115 | 142 | 102 | 131 | 141 | 145 |
| HDT (°C.)$^3$ | ISO 75 | 75 | 75 | 109 | — | 85 | 67 | 90 |
| Notched IZOD RT[4] (kJ/m$^2$) | ISO 180 | 8 | >120 | 64 | 55 | >120 | >120 | >120 |
| Notched IZOD −40° C.[5] (kJ/m$^2$) | ISO 180 | — | 18 | — | — | 10 | 13 | 7.5 |
| Notched CHARPY[4] (kJ/m$^2$) | ISO 179 | 5 | 50 | 36 | nb[6] | 35 | 70 | 34 |
| Tensile Yield (MPa) | ISO R527 | 39 | 31 | 48 | 20 | 39 | 32 | 45 |
| Elongation Rupture (%) | ISO R527 | 100 | 90 | 4 | >115 | 80 | 140 | 60 |
| Flexural Modulus (MPa) | ISO 178 | 1580 | 1310 | 2360 | <500 | 1600 | 1276 | 1748 |

[2-5]See Table I
[6]nb = non-breaking under test conditions employed.

Examples 13-18

In these examples, a series of 4 component blends are prepared, employing thermoplastic polyurethane, 2 types of acetal resin, 2 different ABS polymers and various types of thermoplastic polycarbonate or polyester resins. Additionally prepared are blends using mixtures of 2 different thermoplastic polyester or polycarbonate resins.

All blends are prepared generally in accordance with the procedure described in Examples 1-5 above. The results of the physical property testing and the compositional make-up of the 4 component blends in question are summarized in Table IV.

The results shown, indicate an excellent performance profile of the prepared materials.

TABLE IV

| Compositon (Wt. %) | Test Methods | Examples | | | | | |
|---|---|---|---|---|---|---|---|
| | | 13 | 14 | 15 | 16 | 17 | 18 |
| POM-2 | | 30 | 30 | 30 | 21 | 40 | |
| POM-3 | | | | | | | 30 |
| ABS-1 | | | 35 | 35 | 26 | 20 | 23 |
| ABS-3 | | 23 | | | | | |
| PC-2 | | | | | | | 30 |
| PC-3 | | | | | 20 | 15 | |
| PC-7 | | 30 | | | | | |
| PC-8 | | | | | 20 | | |
| M-PBT | | | 10 | | | 15 | |
| PETG | | | | 10 | | | |
| TPU-1 | | 17 | 25 | 25 | 13 | 10 | 17 |
| VICAT (°C.)$^2$ | ISO 306 | 99 | 112 | 107 | 128 | 139 | 134 |
| HDT (°C.)$^3$ | ISO 75 | 67 | 59 | 61 | 87 | 69 | 75 |
| Notched IZOD RT[4] (kJ/m$^2$) | ISO 180 | 4 | >120 | >120 | 63 | 19 | 15 |
| Notched CHARPY[4] (kJ/m$^2$) | ISO 179 | 7 | nb[6] | 47 | 16 | 12 | 6 |
| Tensile Yield (MPa) | ISO R527 | 36 | 24 | — | 45 | — | — |
| Elongation Rupture (%) | ISO R527 | 20 | 220 | — | 90 | — | — |
| Flexural Modulus (MPa) | ISO 178 | 1580 | 1035 | — | 1630 | — | 1700 |

[2-4] and [6]See Tables I and III.

Examples 19-23

In these examples, 5 different 3 component blends, comprising acetal resin (POM), butadiene rubber-modified styrene acrylonitrile copolymer (ABS) and a thermoplastic polycarbonate or polyester resin are prepared and subjected to physical property testing and evaluation. The thermoplastic polycarbonate or polyester polymers employed are two polycarbonate resins, differing in melt flow rate, one impact modified (with particulate acrylate rubber) polybutylene-terephthalate and a copolyester resin prepared from terephthalic acid, ethylene glycol and cyclohexane dimethanol.

The blends are prepared in accordance with the procedure described in Examples 1-5. The results of the physical property testing and the compositions of the various blends are provided in Table V.

As can be seen from the results in Table V, the prepared blend compositions using a thermoplastic polycarbonate or polyester ingredient exhibit significantly improved thermal stability (HDT and Vicat), compared to the Comparative Example E, an ABS resin. Additionally, the polymer blend composition (i.e., Example 21) prepared using the relatively higher molecular weight (relatively lower melt flow rate, MFR) ABS resin exhibits higher impact strength than the blends (i.e., Examples 19, 20, 22, and 23) made using the lower molecular weight (higher MFR) ABS resin.

TABLE V

| Composition (Wt. %) | Test Methods | 19 | 20 | 21 | 22 | 23 | Comp. Example E |
|---|---|---|---|---|---|---|---|
| POM-1 |  | 24 |  |  |  |  |  |
| POM-2 |  |  | 20 | 20 | 30 | 30 |  |
| ABS-1 |  | 30 | 32 |  | 50 | 50 | 100 |
| ABS-2 |  |  |  | 32 |  |  |  |
| PC-3 |  | 46 |  |  |  |  |  |
| PC-5 |  |  | 48 | 48 |  |  |  |
| M-PBT |  |  |  |  | 20 |  |  |
| PETG |  |  |  |  |  | 20 |  |
| VICAT (°C.)[2] | ISO 306 | 142 | 138 | 138 | 135 | 106 | 97 |
| HDT (°C.)[3] | ISO 75 | 100 | 97 | 98 | 78 | 72 | 79 |
| Notched IZOD RT[4] (kJ/m$^2$) | ISO 180 | 6 | 9 | 14.5 | 5 | 3 | 16 |
| Notched CHARPY[4] (kJ/m$^2$) | ISO 179 | 5 | 7.8 | 10 | 4.4 | 2.8 | 10 |

[2-4]See Table I

Examples 24–28

In these examples, 3 and 4 component blends comprising ABS/POM/PC with and without TPU are prepared which further contain chopped fiberglass as a reinforcing ingredient.

The compositional details and physical properties of the resulting compositions are provided within Table VI along with the data for the composition of Example 7.

As can be seen, the glass fiber containing compositions exhibit higher heat distortion temperature than that of Example 7.

TABLE VI

| Composition (Wt. %) | Test Methods | 24 | 25 | 26 | 27 | 28 | 7 |
|---|---|---|---|---|---|---|---|
| POM-1 |  |  |  |  |  |  | 20 |
| POM-2 |  | 30 | 31.2 | 16.8 | 30.4 | 17.4 |  |
| ABS-1 |  | 20 | 15.6 | 20.8 |  | 21.6 | 40 |
| ABS-2 |  |  |  |  | 15.2 |  |  |
| PC-2 |  |  | 23.4 |  |  |  |  |
| PC-3 |  | 30 |  | 32 |  | 33.2 | 20 |
| PC-6 |  |  |  |  | 22.8 |  |  |
| TPU-1 |  | — | 7.8 | 10.4 | 7.6 | 10.8 | 20 |
| GF-1[8] |  | 20 |  | 20 |  |  |  |
| GF-2[9] |  |  | 22 |  | 24 |  |  |
| VICAT (°C.)[2] | ISO 306 | 151 | 133 | 136 | 136 | 129 | 115 |
| HDT (°C.)[3] | ISO 75 | 124 | — | 102 | — | 129 | 75 |
| Notched IZOD RT[4] (kJ/m$^2$) | ISO 180 | 4 | 5 | 9.6 | 6 | 7.7 | >120 |
| Notched CHARPY[4] (kJ/m$^2$) | ISO 179 | 3 | 4.8 | 10.4 | 5.2 | 7.6 | 50 |
| Tensile Yield (MPa) | ISO R527 | 68 | 67 | 80 | 81 | 78 | 31 |
| Flexural Modulus (MPa) | ISO 178 | 5410 | 5520 | 5100 | 5880 | 4080 | 1310 |

[2-4]See Table 1
[8]Chopped fiberglass OCF 429 YZ (Owens Corning Fiberglass)
[9]Chopped fiberglass EC 10 4.5 mm P-351 (VETROTEX)

While the present invention has been described and illustrated with reference to particular embodiments and examples thereof, such is not be interpreted as in any way limiting the scope of the instantly claimed invention.

What is claimed is:

1. A polymer blend composition comprising, on the basis of a total of 100 parts by weight of the stated polymer ingredients:

A. from 15 to 55 parts by weight of a rubber modified monovinylidene aromatic copolymer comprising, in polymerized form and on a rubber-modified copolymer weight basis
  1. from about 75 to about 97 weight percent of a monovinylidene aromatic copolymer ingredient which comprises, in polymerized form and on an aromatic copolymer ingredient weight basis, from about 55 to about 99 weight percent of one or more monovinylidene aromatic monomers and from about 1 to about 45 weight percent of one or more relatively polar comonomer ingredients; and
  2. from about 3 to 25 weight percent of dispersed particles of a rubbery polymer selected from the group consisting of homopolymers of a 1,3-conjugated alkadiene monomer and copolymers of from about 60 to 99 weight percent of a 1,3-conjugated alkadiene monomer with from about 1 to about 40 weight percent of a monoethylenically unsaturated monomer;

B. from 15 to 40 parts by weight of one or more acetal homopolymer or copolymer ingredients;

C. from 20 to 45 parts by weight of one or more thermoplastic polycarbonate resin ingredients having a melt flow rate, as measured according to ASTM D-1238 at 300° C. and 1.2 kg load, of from about 15 to about 75 grams per 10 minutes; and D. from 5 to 35 parts by weight of one or more elastomeric thermoplastic polyurethane or copolyester elastomer ingredients.

2. The polymer blend composition of claim 1 wherein said composition further comprises, on a total composition weight basis, from about 5 to about 80 weight percent of a particulate or fibrous inorganic filler or reinforcing ingredient.

3. The polymer blend composition of claim 1 wherein said composition further comprises, on a total composition weight basis, from 0.01 to about 5 weight percent of one or more U.V. stabilizer ingredients.

4. The polymer blend composition of claim 3 wherein said composition further comprises, on a total composition weight basis, from 0.01 to about 5 weight percent of an antioxidant ingredient.

5. The polymer blend composition of claim 1 wherein the thermoplastic polyurethane or copolyester elastomer ingredients constitute 5 to 30 parts by weight based on 100 parts of the stated polymer ingredients.

6. The polymer blend composition of claim 5 wherein the thermoplastic polyurethane or copolyester elastomer ingredient comprises one or more ester-containing elastomeric materials employed either alone or in combination with each other or in combination with up to about 70 weight percent, on a total elastomeric material weight basis, of an ether-based thermoplastic polyurethane ingredient.

7. The polymer blend composition of claim 1 wherein the relatively polar monomer ingredient of the monovinylidene aromatic copolymer is selected from the group consisting of ethylenically unsaturated nitriles, ethylenically unsaturated anhydrides, ethylenically unsaturated amides, esters of ethylenically unsaturated carboxylic acids and ethylenically unsaturated dicarboxylic acid imides.

8. The polymer blend composition of claim 1 wherein the rubber-modified monovinylidene aromatic copolymer ingredient is one which is prepared by mass or mass/suspension graft polymerization techniques.

9. The polymer blend composition of claim 8 wherein said composition further comprises, on a total composition weight basis, from 1 to about 15 weight percent of an emulsion polymerized particulate elastomeric material having a volume average particle size of from about 0.05 to about 0.5 micron.

* * * * *